METERS
Filed Feb. 3, 1955 5 Sheets-Sheet 1
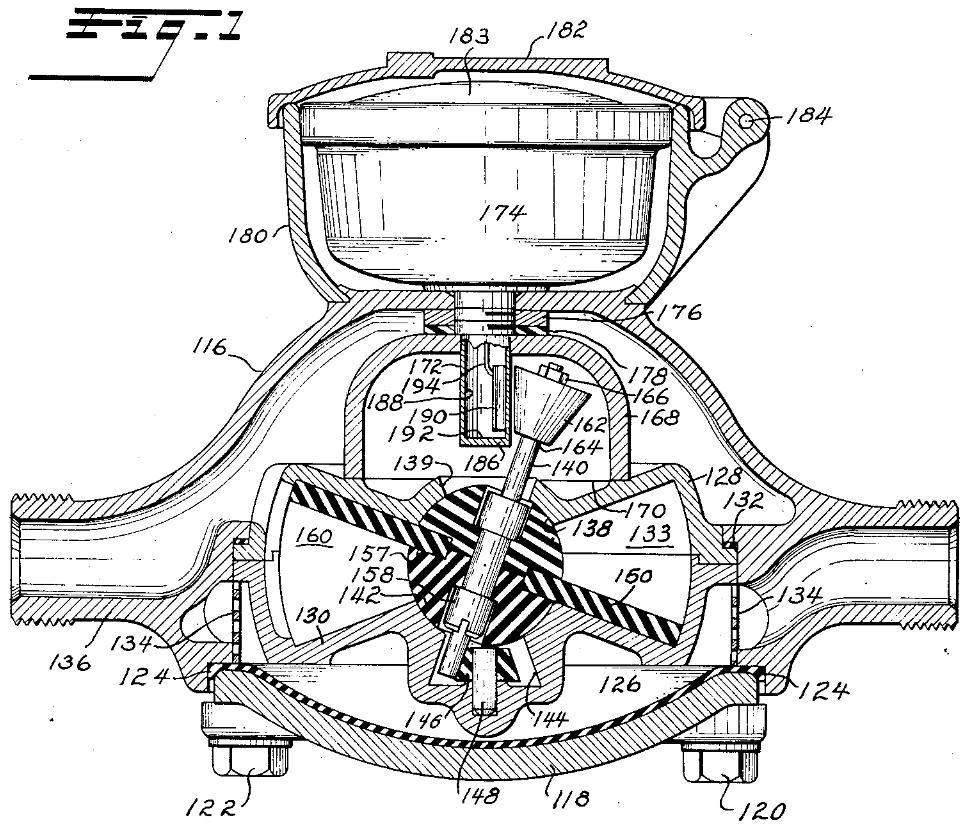
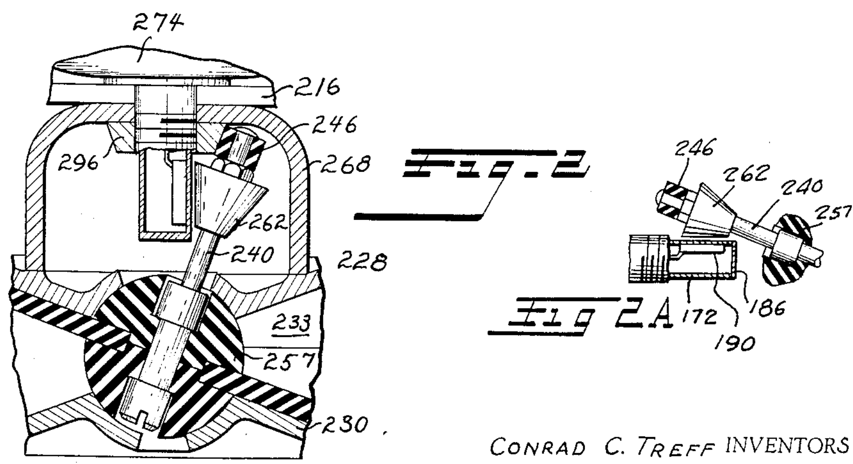
CONRAD C. TREFF INVENTORS
ROBERT Z. HAGUE
BY Strauch, Nolan & Diggins
ATTORNEYS METERS
Filed Feb. 3, 1955 5 Sheets-Sheet 2
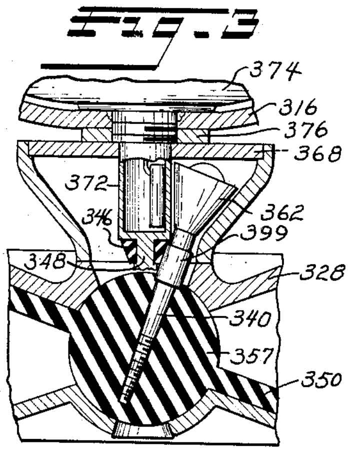
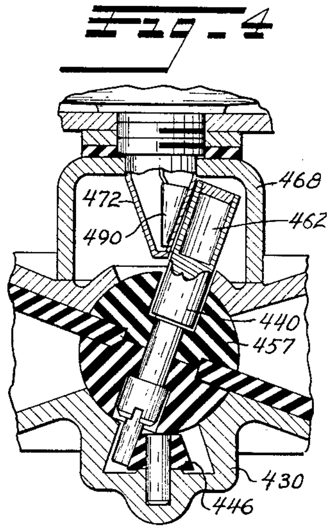
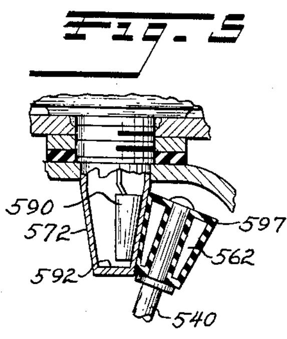
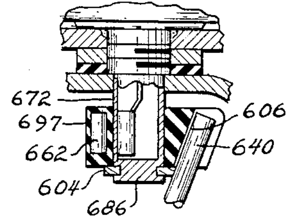
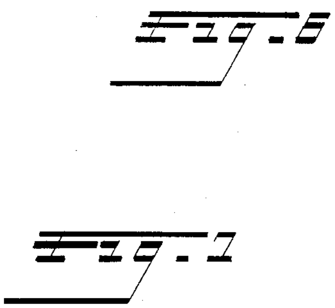
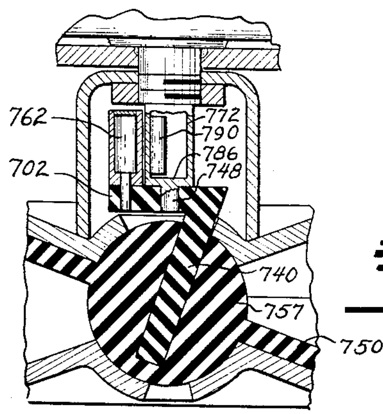
CONRAD C. TREFF INVENTORS
ROBERT Z. HAGUE
BY Strauch, Nolan & Diggins
ATTORNEYS

METERS

Filed Feb. 3, 1955 5 Sheets-Sheet 3

CONRAD C. TREFF
ROBERT Z. HAGUE
INVENTORS

BY Strauch, Nolan & Diggins
ATTORNEYS

CONRAD C. TREFF INVENTOR
ROBERT Z. HAGUE

BY Strauch, Nolan & Diggins
ATTORNEYS

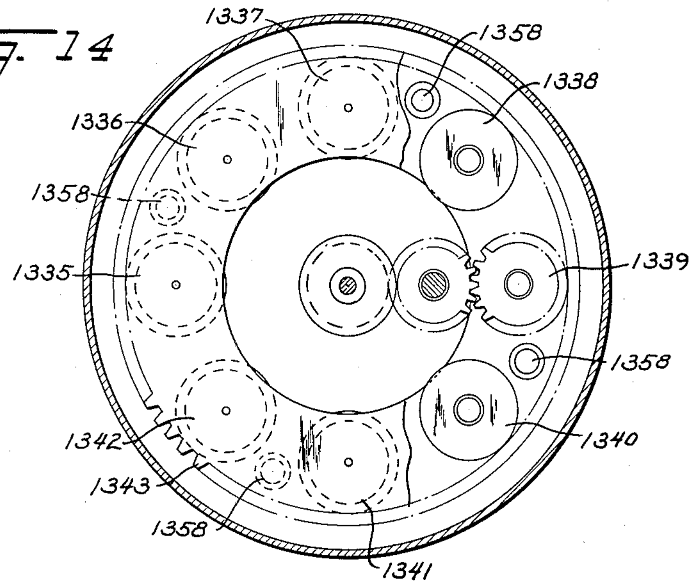
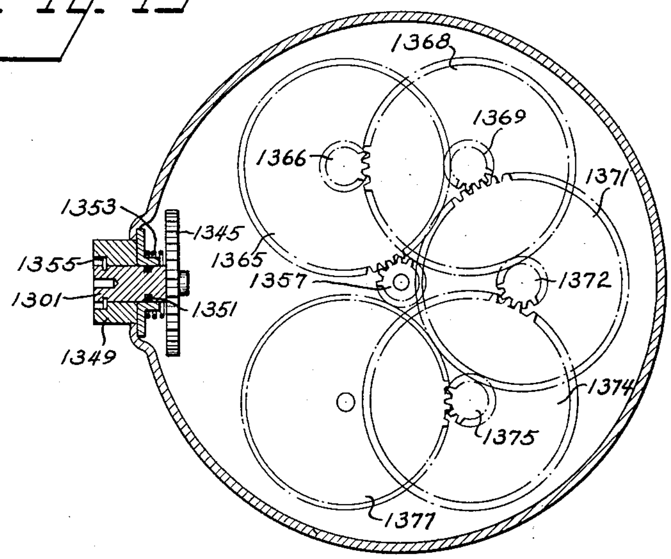
CONRAD C. TREFF INVENTOR
ROBERT Z. HAGUE
BY Strauch, Nolan + Diggins
ATTORNEYS

United States Patent Office 2,921,468

Patented Jan. 19, 1960

1

2,921,468

METERS

Conrad C. Treff, Long Island City, N.Y., and Robert Z. Hague, Oradell, N.J., assignors to Rockwell Manufacturing Company, Pittsburgh, Pa., a corporation of Pennsylvania Application February 3, 1955, Serial No. 485,864

45 Claims. (Cl. 73—258)

This invention relates to fluid meters and in particular to a sealed register that can be adjustably calibrated for use with nutating disk meters, and to magnetic drives for nutating disk meters.

In liquid measuring meters of the nutating disk type the liquid is metered by movement of the disk with the disk spindle operatively connected with the register mechanism for totalizing the amount of fluid passing through the meter. One of the primary reasons why meters of this type are so extensively used is that they are less expensive to manufacture than other equivalent types of fluid meters. Because of the type of construction necessarily used in the nutating disk type meter, wear causes a change in the accuracy of the indication by the register. Therefore the gears in the register drive train are ordinarily changed three or more times during the life of the meter in order to keep the accuracy of the meter within the permitted tolerances.

Since the nutating disk meter is most commonly used as a water meter and the register housing is removable to permit interchanging of the gears, corrosive attack by water and atmospheric elements have required the use of heavy parts of relatively expensive corrosion resistant material such as bronze throughout the register mechanism.

Sealed gear trains and registers, such as that disclosed in copending application entitled Meter Registers and Drive Mechanisms therefor, filed March 14, 1952 by Robert Z. Hague et al. having Serial No. 276,652, now Patent No. 2,858,461, have not been found satisfactory for use with nutating disk meters because there is no provision for recalibration of the register at required periodic intervals during the life of the meter and it is economically unsound to interchange hermetically sealed registers each time the meter must be recalibrated.

According to the present invention we have therefore provided a hermetically sealed register mechanism having means for altering the driving ratio of the register gear train mechanism to thereby permit the use of a single sealed register mechanism with a nutating disk meter for the entire life of the meter without the need of changing gear trains and further permit the use of smaller less costly parts in the register mechanism and in the meter.

As a further feature of our present invention we have provided a simple and efficient drive between the measuring apparatus and the register gear train which is a modified form of the magnetic drive coupling disclosed in the above-identified application of Robert Z. Hague et al. especially adapted for nutating disk fluid meters.

It is accordingly a primary object of this invention to provide a hermetically sealed adjustable ratio register particularly adapted for use with a nutating disk meter but useful in other applications.

Another object of this invention is to provide a hermetically sealed register than can be recalibrated without destroying the hermetic seal.

2

It is a further object of this invention to provide a hermetically sealed meter register that can be easily adjusted to compensate for the wear of the fluid meter and is adapted to be coupled to the meter by a magnetic drive.

It is a still further object of this invention to provide a stud mounted in a hermetically sealed housing wall and movable to effect calibration of a register mechanism without destroying the hermetic seal.

Another primary object of this invention is to provide an improved magnetic drive for a nutating disk type fluid meter.

A further object of this invention is to provide magnetically coupled drive members mounted in a conventional type nutating disk fluid meter and shaped and positioned relative to one another that an efficient and effective drive is provided.

It is a still further object of this invention to provide a compact nutating disk meter and register assembly coupled by a magnetic drive.

It is still another object of this invention to provide permanently magnetized drive members having economically obtainable shapes and mounted in assemblies that permit the use of a housing requiring a minimum amount of bronze.

It is a further and more specific object of this invention to provide a permanently magnetized drive member having soft iron pole pieces.

These and other objects of the invention will become apparent from the claims and as the description proceeds in connection with the accompanying drawings wherein:

Figure 1 is a vertical view in section of one embodiment of our new magnetic drive for a nutating disk type fluid meter;

Figure 2 is a partial vertical view in section of a second embodiment having the disk control roller mounted on the upper portion of the disk spindle and contacting a conical member which holds the register well in place;

Figure 2A is a fragmentary sectional view illustrating a further embodiment of the invention;

Figure 3 is a similar view of another embodiment having the disk control roller mounted on the lower portion of the register well;

Figures 4 and 5 are partial vertical views in section of further embodiments using a conically shaped register well;

Figures 6 and 7 are similar views of additional embodiments having the drive magnet carried by a non-metallic carrier which turns on the magnetic well;

Figure 14 is a horizontal sectional view of the calibration mechanism in the register taken along line 14—14 in Figure 13, and Figure 15 is a partial view in section of the register gears taken along line 15—15 in Figure 13.

Figures 8, 9, 10, 11, 12:
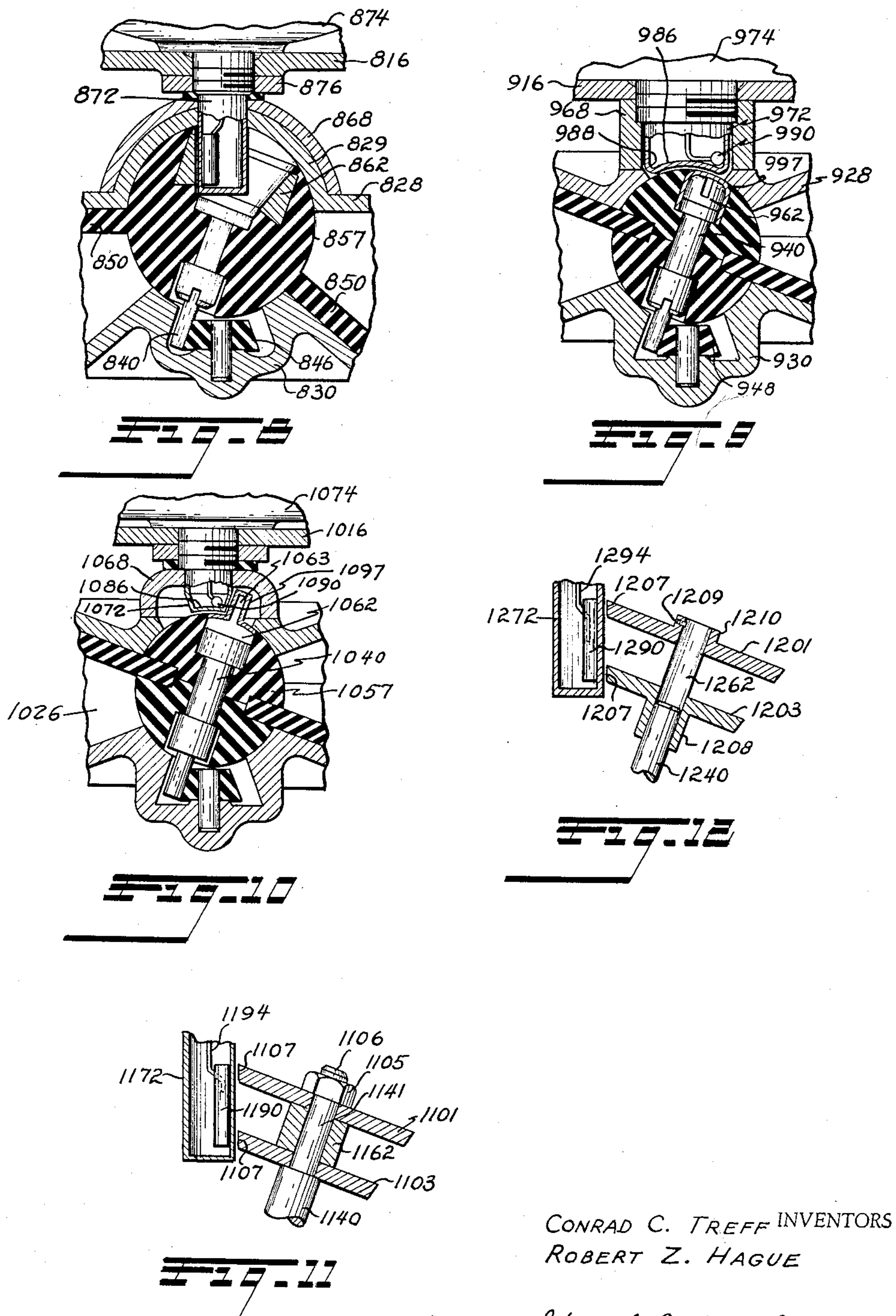
Figures 8 and 9 are partial vertical views in section of further embodiments having the drive magnet embedded in the central bearing ball.
Figure 10 is a vertical view in section of another embodiment which uses a roller ball as the driven member in a magnetic drive.
Figures 11 and 12 are partial views in section of an embodiment having soft iron pole pieces and a bar magnet.

Referring to the drawings, there is shown for purposes of illustration of the novel features of our invention a nutating disk or wobble-plate fluid meter which operates in a well known manner and is similar to the meter as shown in the United States patent to Trager No. 2,316,492 issued April 13, 1943.

As shown in Figure 1, the meter includes an external housing 116 and bottom 118 which are of non-magnetic material such as bronze and are fastened together as by bolts 120 and 122 and pressing therebetween rubber liner 124 thereby forming a hollow fluid tight chamber 126. Inside chamber 126 are upper and lower interior casing members 128 and 130 respectively which are clamped together to be held in position as by a seat and washer 132 on housing 116 and by a surface not shown on bottom 118 forming a measuring or disk chamber 133. Strainer 134 entirely encircles the measuring chamber so that water entering inlet port 136 must first pass through strainer 134. Centrally located in each of the interior measuring chamber members 128 and 130 is a spherical recess. The upper half 138 of the recess is provided with an opening 139 to receive spindle 140 which extends externally of chamber 133. The lower half 142 of the recess may include a conically shaped recess 144 which supports a disk control roller 146 fastened to a shaft 148 which is fixedly secured as to lower casing member 130.

Internally of measuring chamber members 128 and 130 is a disk or plate 150 in the form of a web which is clamped between two halves of a central bearing ball 157. The halves of bearing ball 157 are securely held together as by a round headed nut 158 on a threaded portion of spindle 140. Both plate 150 and central bearing ball 157 may be made of hard rubber or molded plastic. The bearing ball 157 fits into spherical recesses 138 and 142 in a substantially fluid tight but freely movable manner.

Disk 150 has a radial slit extending from its outer periphery to bearing ball 157 to permit disk 150 to pass division plate 160 in a conventional manner. Division plate 160 is held in position by measuring chamber members 128 and 130 in a conventional manner and extends radially to bearing ball 157. This construction comprises the generally essential parts of a conventional wobble disk fluid flow meter which has been chosen to illustrate the novel features of the present invention.

In the operation of this type of meter the disk 150 is caused to wobble about the center of the bearing ball with radial elements of disc 150 moving in a vertical plane between upper casing member 128 and lower casing member 130. Disk control roller 146 cooperates with spindle 140 to cause disk 150 to wobble or nutate and thereby prevents it from attaining a horizontal position.

On the upper end of spindle 140, permanent magnet 162 which in this embodiment has a conical shape is held in position as by shoulder 164 and nut 166. A magnetic shield 168 of soft iron suitably treated to be corrosion resistant rests on seating surface 170 on upper casing member 128 to prevent external magnetic fields from affecting the operation of the magnetically coupled drive. The top of magnetic shield 168 has a hole through which well 172 of register of the type as disclosed in Figures 13, 14 and 15, the type disclosed in the above identified patent application to Robert Z. Hague et al. or other suitable type may extend.

The register 174 is secured to the external meter housing 116 as by nut 176 and a compressible gasket or washer 178 may be used between nut 176 and magnetic shield 168. The magnetic shield includes a portion of soft iron within the top of the well 172 which is a bearing support for spindle 194 to complete the magnetic shield.

On top of exterior housing 116 is protective housing 180 which may take the form of a cup for providing support for the sealed register. A protective cap 182 may be provided to cover the glass face 183 of the register 174 and is hinged to cup 180 as by pin 184.

The part of the magnetic drive in the register housing is similar to the drive described in the above mentioned patent to Hague et al. The tubular well 172 is formed of non-magnetic material and preferably has an integral bottom end wall 186 for operation in the position shown. The inner cylindrical wall 188 of well 172 forms a race way for the relatively small driven magnetic roller member 190 as it follows magnetic member 162 in its circumferential path around the outside wall of well 172. At least one, and preferably both of driving and driven magnetic members 162 and 190 are permanent magnets, with member 190 being cylindrical so as to run around wall 188.

Driven member 190 is normally held in contact with inner cylindrical wall 188 above surface 192 of end wall 186 by the magnetic attraction between driving member 162 and driven member 190. Under the influence of this magnetic attraction, driven member 190 is caused to roll in a path along cylindrical wall 188 with its axis parallel to the surface of magnet 162 adjacent the outer surface of well 172 and radially aligned with the driving member as permanent magnet driving member 162 moves in its circular path.

Figure 13:
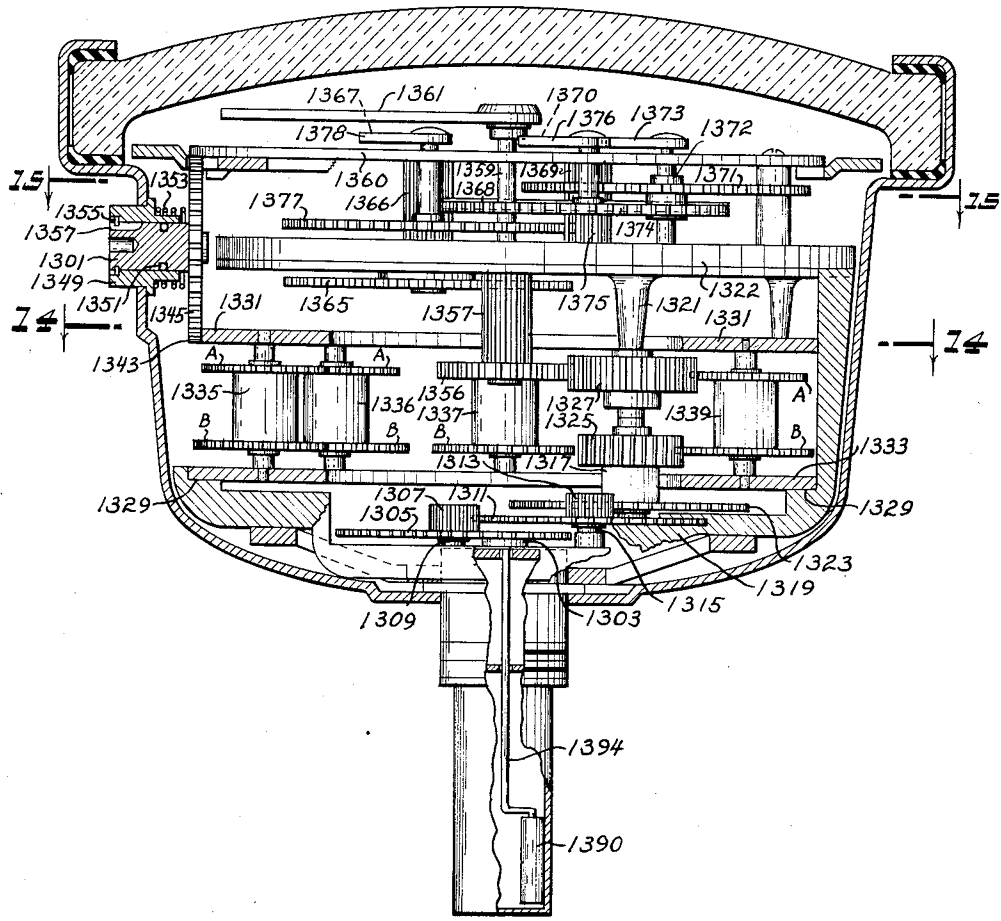
Figure 13 is a vertical view in section of a sealed register than can be recalibrated and is adapted to be used with fluid meters of many types as well as with the meters as shown in the preceding figures.

A light weight non ferro-magnetic register drive spindle 194 preferably of wire such as beryllium copper and of minimum diameter on the order of .020 inch is journalled for rotation inside of register 174. Spindle 194 is bent outwardly as is more clearly shown in Figure 13 at its lower end and then downwardly to form a driving or bearing portion that lies in the path of rotation of roller member 190 that is effectively on the end of a crank-like portion. As driven member 190 rolls over inner surface 188 it will drivingly engage the lower portion of the register drive spindle 194. With the use of a register having extremely low inertia and friction as shown in Figures 13, 14 and 15 the torque requirements are sufficiently low so that there is no chance of the magnetic driving member 162 going past the rolling member 190 without picking it up and rotating register drive spindle 194.

There is no axial restraint upon the driven member 190. If for any reason the driving and driven members should become separated, that is, if magnet 162 and roller member 190 become radially misaligned, the weight of the roller member 190 will cause it to fall axially downwardly under the influence of gravity into engagement with surface 192. Surface 192 is roughened to form a friction brake surface. Frictional engagement of the lower end of driven member 190 with braking surface 192 is sufficient to restrain movement of driven member 190 toward the driving member as the driving member approaches the driven member. Roller member 190 will therefore remain at rest upon braking surface 192 until driving magnet 162 comes into position adjacent roller member 190 to establish radial alignment of members 162 and 190. At that time driven member 190 will be lifted axially from surface 192 to the position shown in the drawings under the influence of the vertical component of the magnetic attractive force between members 162 and 190 and the drive will be re-established. This suppression of the effect of the negative impulse or movement of the driven member toward the driving member as the driving member approaches the driven member not only permits pick-up of the driven member at much higher passing velocities but in effect prevents separation in practical operation.

Since there is no restraint upon the driven member 190 by the driving portion of the register drive spindle 194, the inertia of the register drive train will merely cause the driving portion to coast on ahead of roller member 190 if the driving member 162 is suddenly brought to rest by a rapid shutting off of the fluid passing through the meter. Thus the only inertia tending to separate the driving and driven members is that of the small driven member by itself.

While the magnetic register drive thus far disclosed relies upon the force of gravity to move the end of the driven member 190 into contact with braking surface 192 of end wall 186 upon separation of the driven drive members, this invention also contemplates the use of the magnetic register drive with horizontal drive spindles as illustrated in Figure 2A, in which case the force of gravity may not be relied upon to establish the braking connection. In such instruments driven member 190 is a magnet and end wall 186 of well 172 is formed of magnetic rather than non-magnetic material. The strength of the magnet which forms the driven member 190 and its distance from magnetic end wall 186 are so chosen that the attraction between the driven member and the end wall does not interfere with the driving connection between driving member 162 and driven member 190 so long as such connection is not broken. After this connection is broken, however, either through extraneous magnetic fields or through excessively rapid acceleration of the meter, the attraction between driven magnet 190 and magnetic end wall 186 is sufficient to draw the driven member into contact with the end wall. The magnetic attraction between driven magnet 190 and end wall 186 is then sufficient to prevent movement of the driven member towards the driving member as the driving member approaches the driven member.

If additional braking action is desired, the wall 192 may be roughened as it is when used with a vertical drive spindle. Driven member 190 therefore remains at rest upon the braking surface 186 until the driving member comes to a position adjacent the driven magnet, or considered in another way, until radial alignment of members 162 and 190 is re-established. At that time driven member 190 will be shifted axially from surface 192 into lateral alignment with driving member 162 and the drive will be re-established.

In order to take advantage of the simple, compact and durable assembly of the magnetic drive for a fluid meter of the wobble disc type, it is desirable to shape drive member 162 so that it defines a circular path having a uniform radius as member 162 is moved by spindle 140 so that the strength of the magnetic coupling between member 162 and the follower roller 190 will be substantially constant and sufficient to give reliable operation of the register 174. The advantages of the particular embodiment shown in Figure 1 are that the concentricity of the disk control roller spindle 148 and the disk chamber casing members 128 and 130 can be controlled by close tolerances only on a single part, namely, casing member 130 of the measuring chamber. The concentricity between the upper casing member 128 of the measuring chamber and the magnetic drive is relatively unimportant as slight variations in the length of the magnetic flux path between the driving member and the driven member when the driving magnet has a sufficiently strong field do not affect the operation of the magnetic drive. By extending the length of spindle 140, a relatively large and powerful driving magnet 162 can be used and the weight of the driving magnet acts advantageously to keep the disk 150 in a tipped position.

There is shown a second form of our invention as applied to a wobble plate or nutating disk type meter in Figure 2. As the meter chamber and the lower portion of the exterior housing are substantially the same as shown and described in Figure 1, the description of this figure will be limited only to the signficant differences. For convenience the last two digits of the reference numerals have been used throughout this specification to identify parts that function the same as corresponding parts in Figure 1 with the digital prefix indicating the figure being discussed.

In Figure 2 the magnetic drive is similar to that shown in Figure 1 except that the disk control roller function is handled above the disk chamber 233 rather than below it. As is apparent from the drawing, an extension of disk spindle 240 carries the disk control roller 246 which runs against a conically shaped nut 296 that also serves to hold the sealed register 274 in place. In this embodiment the magnetic shield 268 extends from the upper casing member 228 completely to the inside surface of external housing 216 in order that the extension on the spindle 240 and roller 246 can be accommodated.

By placing the disk control roller 246 and the disk spindle 240 on the end adjacent the magnet drive member 262, the need for the separate control roller spindle in lower casing member 230 is eliminated thereby permitting a full ball socket to be used in lower casing member 230 with a corresponding reduction in wear on ball 257. In this embodiment as well as in Figure 1 driving magnet 262 is large thereby giving a strong driving force.

A further modification of the drive mechanism for the spindle 340 in a wobble-plate meter employing magnetic coupling to drive the register is illustrated in Figure 3. In this form of the invention the sealed register 374 is held to exterior housing 316 by nut 376 which in turn rests adjacent the top of magnetic shield 368. Shield 368 has been so shaped to follow closely the contour of driving magnetic 362 and upper casing member 328 while upper casing member 328 has been seated to receive the mouth of magnetic shield 368.

In this embodiment the disk 350 and central bearing ball 357 are shown to be molded to form a single unitary piece which is drilled and tapped to receive the threaded end of spindle 340. This construction is adaptable for arrangements where disk control roller 346 is located on the same side of central bearing ball 357 as the driving magnet 362. Shaft 348 on the lower side of well 372 supports the disk control roller 346.

Ordinarily such a drive arrangement as this will not be satisfactory as there is insufficient contact surface between shoulder 399 on spindle 340 and roller 346. However with the use of a large drive magnet 362 as shown in this embodiment the unbalance caused by the weight of the magnet mounted on disk spindle 340 helps to keep the disk 350 in tipped position. By shaping the magnetic shield so that its interior side walls closely follow the outside path of drive magnet 362 the magnetic attraction between driving magnet 362 and magnetic shield 368 will also tend to add to the forces present to keep the disk mounted in its tipped position thereby reducing the wear on disk control roller 346. It is obvious that the magnetic attraction force between the drive member and the shield can be used in other modifications by properly shaping the magnetic shield.

Figure 4 shows an embodiment which is similar in many respects to Figure 1 except that in the magnetic drive a cylindrical drive member 462 is used with a conical follower 490 rolling in a conical well 472. The disk control roller 446 may be placed in the lower casing member 430 similar to the construction in Figure 1.

Spindle 440 carries cylindrically shaped permanent magnet 462 inside a non-magnetic casing which may be of stainless steel thereby permitting the use of a relatively large and powerful driving magnet which can be easily enclosed in an extension on the disk spindle 440. The conical shape of the non-magnetic well 472 allows the magnet to be brought closer to the top of the central bearing ball 457 thereby permitting the use of a smaller magnetic shield 468 and reducting the overall height of the meter thus requiring less bronze.

Figure 5 is similar to the embodiment shown in Figure 4 except that the disk control roller function and the magnet driving member have been combined. On the extension of disk spindle 540 a conically shaped magnet 562 is used as a driver and is encased in material suitable as a roller material such as hard rubber 597. By shaping well 572 to have a conical surface against which the outside surface of the roller 597 can run, the overall height of the meter can be further decreased and still permit a relatively large driver magnet to be used. By the use of conically shaped driving magnet 562 and follower magnet 590, the follower can be made to operate well above the bottom of the frustrum of the cone defining well 572 thereby permitting the use of a radius effective to produce a high driving torque on register spindle 590 and the rough frictional surface 592 on the bottom. In this modification a smaller number of parts is required and the overall design is quite simple and compact.

Figure 6 shows a preferred embodiment which is similar in all respects to Figure 1 except for the details shown and therefore is adapted to use the magnetic drive coupling for the register mechanism as shown in the above-mentioned application to Robert Z. Hague et al. In this embodiment the driving magnet 662 is carried by non-metallic carrier 697 which turns on the well 672 for the driven magnet and is held in position as by washer 604 adjacent the lower end wall 686 of the well 672. The magnetic carrier 697 is slotted on the side opposite from drive magnet 662 so that disk spindle 640 will contact carrier 697 and cause rotation of the carrier as the meter disk wobbles. The necessary tilt of the disk may be obtained by mounting the disk control roller on the lower casing member 630 as shown in Figure 1, or alternatively, the roller can be omitted and the upper end of spindle 640 may be guided by surface 606 on magnet carrier 697.

Figure 7 illustrates a modified form of Figure 6. The disk spindle 740 may be of hard rubber and extend only slightly above the top of central bearing ball 757. An integral horizontal portion 702 has a hole which fits around shaft 748 depending from the end wall 786 of well 772 to provide the necessary tilt to spindle 740 and disk 750. The driving magnet 762 and follower magnetic member 790 may be the same as described in Figure 6. The non-magnetic housing for drive magnet 762 is supported on portion 702 of spindle 740.

With this arrangement the register well 772 may be dropped to a position relatively close to central bearing ball 757 and still permit the use of large cylindrically shaped driving and follower magnetic members. The disk spindle 740 operates through a smaller radius than was possible in the modification shown in Figure 6 and this arrangement therefore has additional compactness, results in a smaller overall height of the meter, and requires fewer parts.

The overall size of the meter can be further reduced by using a magnetic drive built into the central bearing ball 857 as shown in the form of our invention illustrated in Figure 8.

The umbrella shaped or inverted conical nutating disk 850 and central bearing ball 857 are preferably molded in an integral form. The meter functions in the same manner the previously described meters function and spindle 840 traverses a conical path about disk control roller 846 in lower casing member 830. Upper casing member 828 includes a spherical portion 829 when used with the inverted conical disk 850 and provides a relatively large bearing surface for central bearing ball 857. This makes it possible to embed drive magnet 862 completely inside the exterior surface of central bearing ball 857.

Drive magnet 862 has a generally cylindrical outside surface with a conical inside surface which permits the interior surface of drive magnet 862 to follow a path concentric with and parallel to the periphery of the register well 872 in operation.

In this modification magnetic shield 868 immediately abuts upper casing half 828 with nut 876 securing the register 874 to the exterior housing 816 in a position much closer to the central bearing ball 857 than has been previously attainable.

Figure 9 is a further embodiment of the invention which utilizes a still different form of the magnetically coupled driver and follower members that is especially adapted for use in the wobble plate or nutating disk type meter. In this embodiment the disk spindle 940 is guided by the disk control roller 948 attached to lower measuring chamber member 930 and on the other end supports a horseshoe magnet 962 which is preferably enclosed by a corrosion resistant thin shielding 997 that is non-magnetic. Magnet 962 and shield 997 all lie interiorly of the surface of central bearing ball 957. The follower 990 is a sphere or ball of magnetizable material which rolls around the inner cylindrical wall 988 of well 972. The end wall 986 has a spherical surface concentric with the outside surface of the central bearing ball 957. This helps spherical follower 990 to follow the path of the maximum magnetic field between the two poles of driver magnet 962.

The magnetic shield 968 outside of the register is merely a cylinder in this embodiment with the inside diameter being merely large enough to accommodate the threaded tube extending from the lower portion of register 974. By threading the interior of magnetic shield 968 it can be used to hold the sealed register 974 against the exterior meter housing 916. The magnetic shield 968 includes magnetic material not shown in this figure, but illustrated in the above-mentioned application of Robert Z. Hague et al., which completes the top of the magnetic shield. In this embodiment the concentricity between the well 972 and the measuring chamber casing members 928 and 930 is relatively unimportant.

Figure 10 shows a modified form of the magnetic drive described and shown in Figure 9. In this embodiment the disk spindle 1040 has upper end 1063 of drive magnet 1062 shaped like an inverted mushroom with a portion of the magnet fitting within the outer spherical surface of central bearing ball 1057. Upper end 1063 of magnet 1062 extends outwardly along the axis of the spindle 1040 and is imbedded in a non-magnetic corrosion resistant sheath 1097. The exterior surface is conically shaped to provide a constant spacing between the adjacent portions of well 1072 and driving magnet 1062. The end wall 1086 has a spherical surface concentric with central bearing ball 1057. The method of attaching the register 1074 to the exterior housing 1016 is the same as shown and described in Figure 1. The magnetic shield 1068 in Figure 10 can be made smaller than shield 168 of Figure 1 because the magnet that extends beyond central bearing ball 1057 is considerably smaller than the magnet 162 used in Figure 1. While the driving force applied by the follower member 1090 is less than in some of the other embodiments, concentricity between the magnetic well 1072 and the measuring chamber 1026 is relatively unimportant and the overall meter including the register is extremely compact.

In the embodiment shown in Figure 11 the magnetic drive includes a permanent magnet driving member 1162 having two soft iron pole pieces 1101 and 1103 at either end of permanent magnet 1162 and extending close to cylindrically shaped register well 1172 in which roller follower member 1190 is mounted to drive spindle 1194. Nutating disk shaft 1140 may be mounted as shown in the preceding embodiments and have at its outer end extension 1141 of a reduced cross section on which pole pieces 1101 and 1103 and magnet 1162 are mounted. The pole pieces and magnet all have a hollow bore and are assembled as by being slid in position over shaft extension 1141. The entire magnetic assembly is held in position as by nut 1105 which fits on a threaded end portion 1106 of extension 1141.

Pole pieces 1101 and 1103 may have the shape of a frustrum of a cone with the slant height element 1107 on the surface of the cone closet to magnetic well 1172 being parallel to the outside surface of the well. The length of roller member 1190 and its distance from the two pole pieces must be chosen so that the reluctance of the magnetic path through the roller member is considerably less than the air space reluctance between the pole pieces. It is therefore desirable to make the walls of well 1172 very thin so that soft iron pole pieces 1101 and 1103 can be as close to roller member 1190 as possible.

An advantage in using pole pieces in combination with a permanent magnet of a cylindrical shape is that soft iron can be more easily formed into the conical shapes required by the nutating disk type meter that can iron which is permanently magnetized.

An even more powerful magnet can be used with the embodiment shown in Figure 12 as magnet 1262 is solid and is mounted as an extension along the axis of shaft 1240 of the nutating disk by a hub 1208 on pole piece 1203. Hub 1208 is held in position by a tight fit with shaft 1240 and is slid along the shaft until the edge 1207 of disk 1203 is spaced closely adjacent to well wall 1172. A set screw, key or other type of fastener may be used if desired. Pole piece 1201 is slid over one end of magnet 1262 and may be secured thereto as by set screw 1209. Magnet 1262 is then slid into hub 1208 until a similar close spacing is obtained between edge 1207 of pole piece 1201 and the wall of well 1272. In small sized meter applications the force fit between the hubs and the magnet may be relied upon for holding the parts in position.

It has been found desirable to construct the pole pieces with hubs 1208 and 1210 extending only on one side of the disk so that when disks are mounted on the ends of magnet 1262 the hubs will not form a low reluctance magnetic path shunting the magnetic field from follower member 1290.

Referring now to Figure 13, there is shown a hermetically sealed register having several pairs of change gears which can be moved selectively into operating position without destroying the seal of the housing. As shown in Figure 1 the sealed register is adapted to fit inside cup 180 and is removable as a unit to permit access to stud 1301 which is operative to move different ones of the change gears in operating alignment with the gear train.

The hermetically sealed register can be used with any measuring instrumentality but is particularly useful with measuring instrumentalities subject to periodic recalibration. Since it is necessary to recalibrate many kinds of measuring instrumentalities including the nutating disk meter as shown in Figures 1 through 12 to compensate for wear and changes in the price of the commodity being measured where the register is calibrated in terms of cost, the magnetically coupled drive of the spindle of the register makes possible the use of a hermetically sealed register. The provision of a hermetically sealed adjustable register provides an improved form of measuring instrumentality which will not be subject to the elements of weather or the harmful effects of the fluid being measured and thereby less expensive parts that do not have to be specially treated to avoid becoming corroded can be used. The register mechanism may be of any suitable construction as the modification illustrated is merely exemplary, and the adjustment member that is movable in the housing without destroying the seal is adaptable to be used with other types of adjusting or calibrating mechanisms such, for example, as is shown in the above mentioned patent to Traeger.

The register may include a drive spindle 1394 which is driven by the magnetic follower member 1390 as discussed in connection with the previous figures. At the upper end of spindle 1394 is a pinion 1303 which is mounted to drive gear 1305 and pinion 1307 on shaft 1309. Pinion 1307 in turn is mounted to drive gear 1311 and pinion 1313 on shaft 1315. Hollow shaft 1317 is rotatably mounted on shaft 1321 extending between fixed members 1319 and 1322 and carries gears 1323 and 1325 which turn together and with pinion 1313. Gear 1327 is journalled about the same vertical axis, but independently of gears 1323 and 1325.

The compensating or calibrating mechanism comprises a cylindrical rotatable carrier formed of two annular plates 1331 and 1333 which support gear pairs 1335 through 1342 inclusive and is mounted to rotate on annular surface 1329 of fixed member 1319. Plate 1331 is shown formed with gear teeth 1343 which engage with the teeth on pinion 1345 mounted on stud 1301 which extends through hollow cylindrical sleeve 1349.

Stud 1301 is grooved to carry an O-ring 1351 which tightly engages the interior surface of member 1349 to maintain the seal of the register while permitting stud 1301 to be rotated. The stud 1301 and pinion 1345 are biased inwardly against annular plate 1331 by compression spring 1353 and restrained from excessive inward movement by thrust washer 1355. The exterior portion of stud 1301 may include a keyway 1357 or a projecting surface so that the stud and pinion can be rotated by a properly formed mating tool, not shown.

Rotation of stud 1301 and pinion 1345 will cause annular plates 1331 and 1333 to rotate and move different gear pairs 1335 through 1342 into mating engagement with gears 1325 and 1327 in a manner well known in the art and as shown in Patent No. 1,964,352 issued to Charles F. Hazard on June 26, 1934. Each of the gears A and B on the various gear pairs 1335 through 1342 turn together and as the various gears A and B may be made to have slightly different numbers of teeth such as pointed out in the above-mentioned patent to Hazard, different gear ratios can be established for each gear pair between the measuring instrumentality and the register display mechanism. Gear 1325 drives gear B of gear pair 1339 and gear A drives gear 1327. Gear 1327 drives gear 1356 and pinion 1357.

Figure 14 shows a partial sectional view of the compensating mechanism taken as indicated by lines 14—14 in Figure 13. Pins 1358 not shown in Figure 13 provide additional rigidity between the annular plates 1331 and 1333.

Gear 1356 and pinion 1357 are mounted on spindle 1359, which is journalled in fixed member 1322 and scale plate 1360, extends centrally of the register and carries pointer 1361. Pinion 1357 drives gear 1365, pinion 1366 and pointer 1367 which is directly behind pointer 1378 in Figure 13 and which may indicate tens of units.

Figure 15 is a view in section taken along line 15—15 of Figure 13 and shows a plan view of the conventional gearing arrangement as used in a register of this type. Pinion 1366 is in meshing contact with gear 1368 and drives pinion 1369 and pointer 1370 which is directly behind pointer 1376 in Figure 13 and may indicate hundreds of units. Pinion 1369 drives gear 1371, pinion 1372 and pointer 1373 which may indicate thousands of units; pinion 1372 drives gear 1374, pinion 1375 and pointer 1376 indicating tens of thousands of units; and pinion 1375 drives gear 1377 and pointer 1378 indicating hundreds of thousands of units.

While there has been described a specific embodiment of the sealed register that can be calibrated, it is apparent that other types of register mechanisms can be enclosed in a hermetically sealed housing and adjustably calibrated in accordance with the principles of the present invention. It is also contemplated that the easily adjusted sealed register is to be used with other types of metering apparatus and whether or not the magnetically coupled drive members are used, but it is noted that the sealed register of the type disclosed herein is particularly well adapted and from a practical standpoint essential when used in combination with the wobble-plate or nutating disk meters because of change in accuracy during the life of the meter due to wear of the meter elements.

The particular embodiments of the magnetic coupling adaptable for wobble-plate meters are illustrative of the important features that can be combined to provide this improved meter drive.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a nutating disk meter having a disk mounted for nutating movement therein; a hermetically sealed register housing containing a register mechanism; a drive mechanism for driving said register mechanism; means to effect a change in the overall drive ratio to recalibrate the register mechanism without destroying the hermetic seal; and permanent magnetic driver and driven means mounted respectively exteriorally and interiorally of said sealed housing for movement in concentric paths and magnetically coupled through said housing to drive the input to said register mechanism in synchronism with said disk's nutating movement, at least the portion of said register housing between said driver means and said driven means being formed of non-magnetic material, said driver means being drive connected to said disk.

2. In combination, a spindle mounted to move through a conical path, a tubular member having its axis directed toward the apex of the conical path, a magnetic drive including a driving member mounted exteriorally of said tubular member to move in a closed path concentric with said axis concomitantly and in synchronism with said spindle and a driven member mounted to revolve concentrically inside said tubular member, at least one of said members of said magnetic drive being a permanent magnet having poles spaced axially of said spindle and the other being attracted thereto, the locus of the elements on the exterior of the driving member closest to the surface of said tubular member at each position forming a closed path spaced at a substantially uniform distance from the surface of said tubular member.

3. The combination as set forth in claim 2 wherein said driven member is a cylindrically shaped roller member.

4. The combination as set forth in claim 2 wherein said driven member is a spherically shaped roller.

5. The combination as set forth in claim 4 wherein the driving member is a U-shaped member.

6. The combination as defined in claim 4 wherein the driving member is a permanent magnet and has one pole extending along the side wall of said tubular member and the other pole located adjacent the bottom of said tubular member.

7. The combination as set forth in claim 2 wherein the driven member is a conically shaped roller member.

8. The combination as defined in claim 7 wherein the driving member has a conically shaped exterior surface.

9. The combination as defined in claim 7 wherein the driving member has a cylindrically shaped exterior surface.

10. The combination as defined in claim 2 wherein the driving member is mounted for rotation about the axis of said tubular member.

11. The combination as defined in claim 10 wherein the driving member is embedded in a non-metallic carrier having a slot, and the spindle extends into and engages the slot in said carrier.

12. The combination as defined in claim 10 having a spindle guide member that is an integral with the spindle and supports a non-magnetic carrier in which the driving member is embedded.

13. The combination as set forth in claim 2 wherein the drive magnet contains a central bore and is mounted to surround the side wall of said tubular member coextensive with the length of said driven member.

14. The combination as defined in claim 2 wherein said driving member comprises an elongated permanently magnetized member having pole pieces on each end extending closely adjacent said tubular member.

15. The combination as defined in claim 2 wherein said driving member comprises a bar magnet having a hollow center portion mounted on the end of said spindle and a pair of pole pieces extending closely adjacent said tubular member.

16. The combination as defined in claim 2 wherein said driving member comprises a bar magnet and a pair of pole pieces, a central bore in each of said pole pieces, and a hub surrounding said bore on one of said pole pieces to hold said bar magnet and said shaft in axial alignment.

17. In combination, a wobble disk meter having a shaft tiltably mounted from its axis of rotation through a predetermined angle and adapted to move in a conical path, a permanently magnetized member having a conical shaped portion mounted on said shaft with the apex half-angle substantially equal to said predetermined angle, means disposed within the path of movement of said magnetized member and defining on an interior face thereof a non-magnetic annular raceway, a free rolling member disposed on said raceway and magnetically biased against said raceway by and coupled to said magnetized member through said raceway defining means, and a register mechanism having its input drive coupled to said free rolling member.

18. The combination as defined in claim 17 wherein said magnetized member is secured near one end of said shaft and the shaft is tiltably mounted by abutting against a disk control roller at its other end.

19. The combination as defined in claim 17 further having a magnetic shield surrounding the path of said magnetized member with said magnetic shield being shaped to have a surface substantially parallel to the element on the magnetized member closest to the shield at all positions of the magnetized member.

20. In combination, a wobble disk meter having a shaft tiltably mounted from its axis of rotation through a given angle and adapted to move in a conical path, a register housing, a roller of magnetizable material, a well sealed to said housing and having a wall of non-magnetic material providing a closed path for said roller, a permanently magnetized member mounted to move with said shaft, said member having a conically shaped portion having an apex half-angle equal to said given angle.

21. In combination, a nutating disk meter having a spindle, a spindle guide member mounted to guide the spindle to a conical path, a magnetic drive comprising a first magnetizable member having a conical external shape mounted on said spindle so that the external surface of said member defines a cylindrical path as the spindle moves through its conical path, a follower member mounted for rolling movement in a circular path spaced from and concentric with said cylindrical path, said members being magnetically attracted to each other so that movement of said drive member in its path causes the follower member to follow.

22. The combination as set forth in claim 21 wherein said circular path is provided by a hollow tube of non-magnetic material, and said spindle guide member is mounted near the upper end of said tube.

23. In combination with a nutating disk meter having a shaft tilted for movement in a conical path, sealed register mechanism housing, a register mechanism in said housing, means operable from the exterior of said housing to change the overall drive ratio of said register mechanism without destroying the housing seal, a well having a wall of non-magnetic material, a spindle inside said well with the axis of said spindle, said well and the conical path substantially in axial alignment, means drive connecting said spindle to said register mechanism, and means magnetically coupled through said wall to drive said spindle in synchronism with said shaft.

24. In combination with a hermetically sealed housing containing a register mechanism for a meter, a register spindle, a gear train having an adjustable overall gear ratio driven by said spindle and driving said register mechanism; and means operable from the exterior of said housing to change the gear ratio of said gear train without destroying said hermetical seal, and means magnetically coupled through a sealed wall of said housing for driving said gear train.

25. In combination a hermetically sealed housing having a register mechanism, a mechanical drive mechanism for driving said register mechanism, said drive mechanism having an element that is movable by manipulation thereof exteriorally of said housing to effect a change in the overall drive ratio to calibrate the register without destroying the hermetic seal and means magnetically coupled for driving said mechanical drive mechanism through a sealed wall of said housing.

26. In combination a hermetically sealed housing having a register mechanism, a mechanical drive mechanism for operating said register mechanism, said mechanical drive mechanism having an element that is movable to effect a change in the overall drive ratio to calibrate the register, means to move said element comprising a stud extending through and mounted for rotation in sealed relationship with a wall of said housing and adapted exteriorally of said housing to facilitate rotation thereof without destroying the hermetic seal, and means including a magnetic coupling through a sealed wall in said housing for driving said drive mechanism.

27. In combination, a hermetically sealed housing having a register mechanism, a gear train for driving said register mechanism, said gear train having different pairs of gears that are adapted to be interchangeably substituted in the gear train to effect recalibration of the register, a rotatably mounted annular member for supporting said gear pairs, means to move said annular member comprising a stud mounted for rotation in a sealed relationship through a wall of said housing and adapted exteriorally of said housing to be rotated without destroying the hermetic seal, a magnetic drive having a drive member and a driven member, said driven member being inside said sealed housing and operative to drive said gear train, and said drive member being mounted to move in a closed path closely spaced to a wall of said housing whereby the magnetic attraction between said drive member and said driven member will cause the driven member to follow the movement of the driven member in its path.

28. In combination a fluid measuring device having a fluid metering element, a register mechanism, a drive mechanism for coupling movement of said element to the register mechanism, said register mechanism and a portion of said drive mechanism being enclosed in a hermetically sealed housing, said drive mechanism including a pair of magnetically coupled members, one of said pair of members being inside said sealed housing and the other being on the outside of said housing, means mounted in said sealed housing for calibrating the register mechanism without destroying the hermetic seal, and a member extending in fluid tight relation through said housing and operatively coupled to said calibrating means to actuate said calibrating means in response to manipulation thereof.

29. In combination with a fluid measuring device of the wobble-plate type, a register mechanism, a drive mechanism for coupling movement of the wobble-plate to the register mechanism, said register mechanism and a first portion of the drive mechanism being enclosed inside a hermetically sealed housing, a second portion of said drive mechanism being outside said sealed housing, said first portion of the drive mechanism including means manipulatable from the exterior of said housing without affecting the seal of said housing for changing the speed reduction of said drive mechanism, and means magnetically coupling said second portion of the drive mechanism to said first portion through a wall of said hermetically sealed housing.

30. In combination, a nutating disk fluid flow measuring device having a disk mounted therein for nutation in response to fluid flow therethrough, a register mechanism totally encased within a fluid tight casing, and a magnetic drive coupling interconnecting said device and said mechanism comprising a driving member drive connected to said disk and mounted for movement in a predetermined closed path externally of said casing in response to fluid flow through said device and a driven member, one of said members being a permanent magnet and the other being influenced by the magnetic field thereof, said driven member being mounted within said casing for movement therein in a predetermined closed path under the influence of the magnetic field between said members, the non-magnetic gaps between the poles of said one member and said other member being substantially equal, and means in said casing, responsive to movement of said driven member for driving said mechanism.

31. A nutating disc meter comprising a fluid flow measuring device having a casing and a disc mounted for nutation therein, a meter housing structure having an inlet and an outlet, said housing structure enveloping said measuring chamber and cooperating therewith to confine fluid flow between said inlet and outlet to a path through said measuring device, a register mechanism totally encased within a casing mounted on said housing and having a depending closed end non-magnetic tubular well coaxial with said measuring device casing and having a register drive-spindle concentrically mounted therein, a magnetic drive coupling between said nutating disc and said spindle comprising a driving member mounted within said housing for movement in a closed path about and concentric with a portion of said tubular well in synchronism with the nutating movement of said disc, means drive connecting said driving member to said disc to effect movement of said driving member along said path in response to nutation of said disc, a driven member mounted in said housing for movement therein in a path concentric therewith, one of said members being a permanent magnet and the other being attracted thereto, and the lengths of the non-magnetic gaps between the poles of the permanent magnet and the most closely adjacent portion of the other of said members being substantially equal throughout the paths of movement of said members.

32. The nutating disc meter defined in claim 31 wherein said driving member is a permanent magnet.

33. The nutating disc meter defined in claim 31 wherein said driving member is mounted on said nutating disc.

34. The nutating disc meter defined in claim 31 wherein said driven member is mounted for movement in a circular path within said tubular well and wherein said driving member is a permanent magnet mounted on said nutating disc for movement therewith in a path such that the opposite poles thereof are at substantially equal spacing from the most closely adjacent portions of said follower member at all points in its path of movement.

35. The nutating disc meter defined in claim 31 wherein said driven member is a ball mounted within said tubular well for rolling movement in a circular path concentric with said tubular well and wherein said driving member is a permanent magnet having spaced poles substantially equally spaced from the center of said ball.

36. A nutating disc meter comprising a fluid flow measuring device having a casing and a disc mounted for nutation therein, a meter housing structure having an inlet and an outlet, said housing structure enveloping said measuring chamber and cooperating therewith to confine fluid flow between said inlet and outlet to a path through said measuring device, a register mechanism totally encased within a casing mounted on said housing and having a depending closed end non-magnetic tubular well coaxial with said measuring device casing and having a register drive spindle concentrically mounted therein, a magnetic coupling between said nutating disc and said spindle comprising a driving member mounted within said housing for movement in a closed path about and concentric with a portion of said tubular well, means drive connecting said driving member to said disc to effect movement of said driving member along said path in response to nutation of said disc, a driven member mounted in said tubular well for movement therein in a path concentric therewith, one of said members being a permanent magnet and the other being attracted thereto, and the lengths of the non-magnetic gaps between the poles of the permanent magnet and the most closely adjacent portion of the other of said members being substantially equal throughout the paths of movement of said members, at least the opposite end portions of said driving member being frusto-conical in form coaxial with said disc and equally spaced from said driven member.

37. In a nutating disc fluid meter, means defining a measuring chamber, a disc mounted for nutation in said chamber whereby the axis of said disc defines a cone during each cycle of disc nutation, a register, a static fluid seal interposed between said register and said measuring chamber defining means and having a non-magnetic portion, and magnetic coupling means operative in synchronism with the cyclical nutation of said disc coupling said register to said disc through said static sealed portion, said coupling means embodying a pair of magnetic elements, one on each side of said seal portion and at least one of which is a permanent magnet having spaced poles, said elements being mounted for movement in substantially uniformly spaced closed paths and drive connected to said register and disc respectively, the spacing of the path of movement of the other of said elements from at least one of the poles of said one element being substantially uniform.

38. The nutating disc meter defined in claim 37 wherein the one of said elements on the measuring chamber side of the seal is fixed to said disc.

39. A nutating disc fluid meter having a register and a nutating disc measuring chamber device drive connected through a fluid tight partition interposed between the register and the device by a magnetic coupling embodying driving and driven members disposed on the device and register sides of a non-magnetic portion of said partition respectively and at least one of which is a permanent magnet having spaced poles and the other of which is magnetically coupled thereto, said meter being characterized in that the driving member is mounted on the nutating disc of said device for movement in a predetermined closed path and the driven member is mounted for movement in an adjacent closed path such that the spacing between the path of movement of at least one of the poles of the permanent magnet one of said members and the path of movement of the other of said members is substantially uniform.

40. A nutating disc fluid meter having a register and a nutating disc measuring chamber device drive connected thereto through a fluid tight partition interposed between the register and the device by a magnetic coupling embodying driving and driven members disposed on the device and register sides of a non-magnetic portion of said partition respectively and at least one of which is a permanent magnet having spaced poles and the other of which is magnetically coupled thereto, said meter being characterized in that the driving member is mounted for revolution about the axis of nutation of the disc of said device and connected to the disc of said device for synchronous movement therewith in a predetermined closed path at substantially the same speed as the nutating movement of said disk and in that the driven member is mounted for movement in an adjacent closed path such that the spacing between the path of at least one of the poles of the permanent magnet one of said members and the path of movement of the other of said members is substantially uniform.

41. A nutating disc fluid meter having a register and a nutating disc measuring chamber device drive connected thereto through a fluid tight partition interposed between the register and the device by magnetic coupling embodying driving and driven members disposed on the device and register sides of a non-magnetic portion of said partition respectively and at least one of which is a permanent magnet and the other of which is magnetically coupled thereto, said meter being characterized in that the driving member is mounted for movement in a predetermined closed path in fixed concentric relation to the axis of nutation of the disc and connected to the disc for synchronous movement therewith and in that said partition portion has means thereto defining an annular raceway concentric with the disk nutation axis and adjacent the path of movement of the driving member and that the driven member is a free rolling member disposed on said raceway for movement along said raceway under the influence of its magnetic coupling to the driving member, the spacing between said raceway and the path defined by the locus of the elements on the exterior of the driving member closest to said raceway being substantially uniform.

42. The meter defined in claim 41 wherein said driven member is cylindrical.

43. The meter defined in claim 41 wherein said driven member is frusto-conical.

44. The meter defined in claim 41 wherein said driven member is spherical.

45. In a nutating disc fluid meter, a disc mounted for nutating movement about a predetermined axis in response to fluid flow through the meter, a register mechanism in said meter in axial spaced relation to said disc, a fluid tight partition interposed between said register mechanism and said disc and embodying a projecting portion of non-magnetic material extending toward said disc, means in said projecting portion defining an annular raceway in the form of a surface of revolution concentric with said axis, a magnetic coupling drive connecting said disc and said register through said partition portion and comprising a driving member mounted for movement in a continuous path concentric with said axis adjacent said raceway and connected to said disc for synchronous movement with said disc and a driven member disposed within said partition projection for rolling movement along said raceway, at least one of said members being a permanent magnet and the other being magnetically coupled thereto, and means drive connecting said driven member to said register mechanism, the spacing between said raceway and the path defined by the locus of the elements on the exterior of the driving member closest to said raceway being substantially uniform.

References Cited in the file of this patent

UNITED STATES PATENTS

| | | |
|---|---|---|
| 471,295 | Thomson et al. | Mar. 22, 1892 |
| 588,646 | Lambert | Aug. 24, 1897 |
| 957,082 | Nash | May 3, 1910 |
| 1,724,272 | Ford | Aug. 13, 1929 |
| 1,824,781 | La Bar | Sept. 29, 1931 |
| 1,964,352 | Hazard | June 26, 1934 |
| 2,354,563 | Weisse | July 25, 1944 |
| 2,393,671 | Wolfe | Jan. 29, 1946 |
| 2,487,783 | Bergman | Nov. 15, 1949 |
| 2,566,220 | Lindley | Aug. 28, 1951 |

FOREIGN PATENTS

| | | |
|---|---|---|
| 957 | France | Apr. 29, 1903 |
| 381,651 | France | Nov. 16, 1907 |
| 580,069 | France | Aug. 20, 1924 |
| 449,496 | Great Britain | June 29, 1936 |